Sept. 20, 1971     L. A. CAMPBELL     3,606,388
VEHICLE COUPLING
Filed March 4, 1969     2 Sheets-Sheet 1
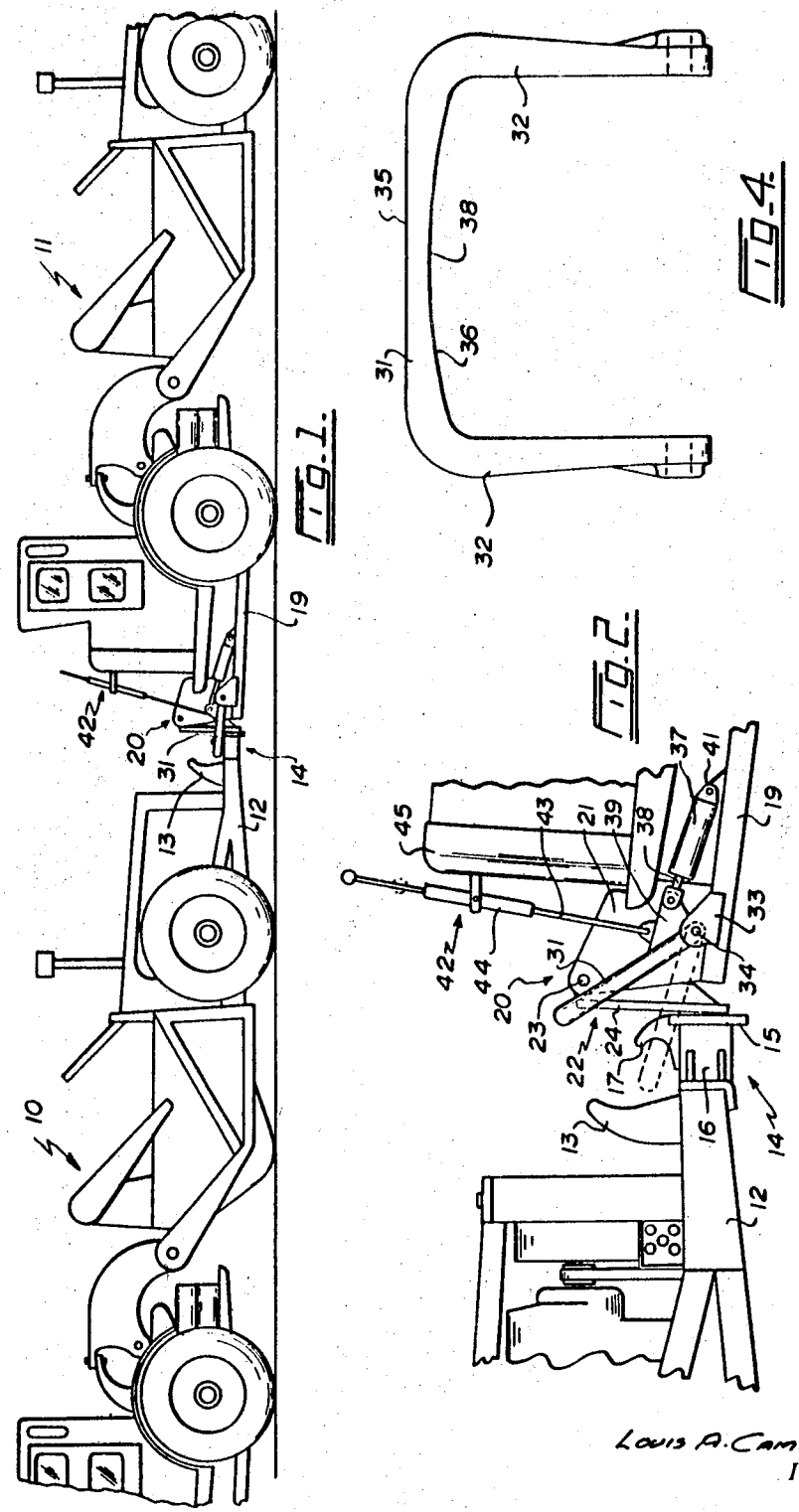
Louis A. Campbell
INVENTOR.
BY 
AGENT

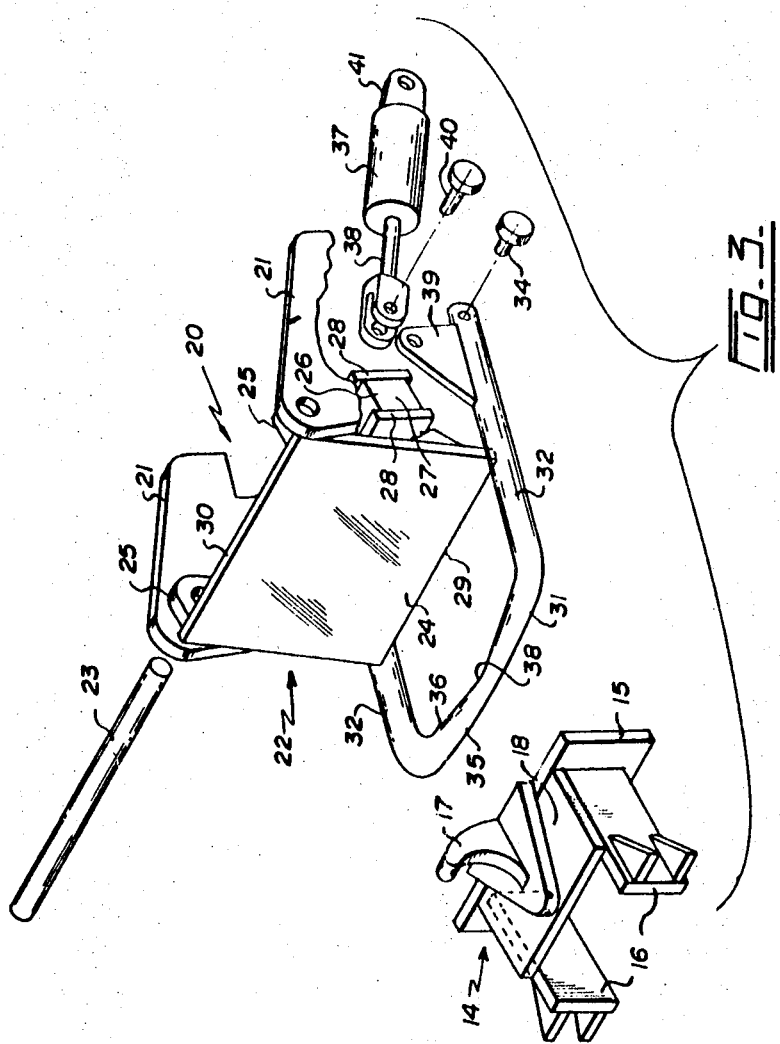

United States Patent Office 3,606,388
Patented Sept. 20, 1971

3,606,388
VEHICLE COUPLING
Louis A. Campbell, 4632 1st St. SE., Box 5160 Postal
Station A, Calgary 9, Alberta, Canada
Filed Mar. 4, 1969, Ser. No. 804,212
Int. Cl. B62d 53/00
U.S. Cl. 280—477                    14 Claims

ABSTRACT OF THE DISCLOSURE

A push-pull hitch for coupling a pair of self-powered traction vehicles for alternate selective pulling effort of the leading vehicle upon the following vehicle and pushing effort of the following vehicle upon the leading vehicle. For pushing effort, a pair of registering bumper assemblies are mounted respectively on the rear portion of the leading vehicle and the forward portion of the following vehicle, sized and positioned for mutual registration when the two vehicles are substantially misaligned. For pulling effort, a hook member is mounted on one vehicle, and a U-shaped drawbar is mounted on the second vehicle; the drawbar is adapted to be selectively lowered into engagement with the hook member and disconnected therefrom when the two vehicles are substantially misaligned and in motion.

---

This invention relates to new and useful improvements in hitches or the type used to couple a pair of tractors, scrapers or the like, commonly used in earth moving operations.

In earth-moving practice, as encountered for example, in road and dam construction and land leveling, where earth fill is required to be cut and moved from a borrow site to a required fill site, it is customary to employ a plurality of self-powered tractor-scraper vehicles, each incorporating a scoop or bucket, known as a "bowl," which cuts the earth from the borrow site and carries it to the fill site for unloading. Such vehicles are normally operated in circuit, in following relationships.

The power requirements of such vehicles will vary substantially from a maximum power requirement when the scraper bowl is engaging and loading the fill to be removed, to a minimum power requirement when the vehicle is returning in unloaded condition. In a design of such vehicles, the power unit is necessarily an economic compromise, and is generally of lower power than is required for minimum loading time, particularly when difficult loading conditions prevail.

Further, in difficult soil conditions, excessive tire wear on the scraper units is frequently encountered, resulting from slippage of the tires on the powered axle, when the bowl is engaged in the filling operation. Accordingly, it has heretofore been common to utilize an assisting vehicle, customarily a crawler tractor, at the borrow site, pushing against the rear of the tractor-scraper vehicle, to supplement the available power required during the loading operation. However, such an operation is wasteful of vehicles, manpower and time required to bring the two vehicles into engagement, and several alternatives have been employed with some success. Scraper vehicles are sometimes used in tandem relationship, a solid or non-disengaging hitch being employed, coupling a pair of such vehicles in permanent "train" relationship, with dual controls available to a single operator who is normally positioned in the leading vehicle. Such a permanent tandem operation has not been found satisfactory because of the excessive time required in converting from single to tandem operation, the difficulty in operating the "train" in critical conditions as when the terrain is excessively irregular, and because of the necessary shut down of the entire train when failure of an individual vehicle occurs.

A further alternative, which has also been found to be less than satisfactory, is the operation of the scrapers in co-operating, but uncoupled pairs, wherein a following self-powered scraper unit is brought to bear against a bearing plate or bearing roller mounted on the rear of the leading vehicle, in order to supplement the tractive effort of the forward when the bowl of the forward vehicle is engaging the ground at the borrow site. During such an operation, the assisting following vehicle normally has its bowl clear of the ground, and is used only to supplement the tractive effort of the forward vehicle. When the forward vehicle has been loaded, the bowl is then raised clear of the ground, and the forward vehicle then becomes an effective supplement for the following vehicle in a similar operation. However, it is necessary then to interchange the positions of the vehicles, so that the loaded vehicle then assumes a position behind the unloaded vehicle, and supplements the tractive effort of the unloaded vehicle by pushing effort. It will be apparent that such a paired operation is inefficient, since time is lost in positioning and aligning the two vehicles.

The present invention is designed to overcome the disadvantages of the heretofore conventional methods of supplementing the power requirement at the borrow site, by providing a hitch assembly for two or more self-powered scraper units, which alternatively functions as a push-type hitch and a pull-type hitch, without significant loss of time in the coupling operation. Releasable couplings or hitches have heretofore been proposed, for the selective inter-connection of leading and following vehicles in traction-pushing relationship. However, such devices heretofore known have all suffered from inherent limiting disadvantages which the device of the present invention is designed to overcome. Such prior devices have not proven effective over uneven terrain, when one of the coupled vehicles may be at a substantially different elevation from the other, or at a substantially different aspect relative to the horizontal; at such times unwanted disconnection frequently occurs due to the hitch members of the respective vehicles coming out of register, resulting in interruption of the operation until the coupling components are re-engaged. Additionally, such heretofore known push-pull hitches have required that the pair of vehicles be substantially in alignment before coupling can be accomplished, either for pushing assist by the following vehicle or pulling assist by the leading vehicle.

The principal object and essence of the improvements mentioned is to provide a novel quick-operating push-pull hitch for use between two such vehicles, whereby the leading vehicle may be pushed by the following vehicle in order to assist the tractive effort of the leading vehicle, and, alternatively, the leading vehicle may assist the following vehicle by pulling it, in order to supplement the tractive effort of the following vehicle.

It is therefore an important additional object of the present invention to provide a push-pull hitch for use between two such vehicles, in which substantial differentials in elevations and substantial differentials in attitude relative to the horizontal in the two vehicles will not result in unwanted disengagement of the hitch, in either tractive or pushing operation.

As hereinbefore referred to, another significant disadvantage inherent in the design of such push-pull hitches as have heretofore been proposed resides in the limiting requirement that the longitudinal axis of each of the pair of vehicle hitches be substantially in alignment, in order to permit registration of the push components and the pull components of the hitch.

It is therefore a further object of the present invention to provide a novel push-pull hitch for use between two such vehicles which is engageable in both pushing and pulling assist operations, notwithstanding substantial lateral non-alignment of the longitudinal axis of each of the pair of vehicles.

With the foregoing objects in view, and such other objects and advantages as will become apparent to those skilled in the art to which this invention relates as this specification proceeds, this invention consists essentially in the arrangement and construction of parts all as hereinafter more particularly decribed, reference being had to the accompanying drawings in which:

FIG. 1 is a side elevation of a pair of self-propelled vehicles utilizing the device of the invention, the forward vehicle being used to pull the rearward vehicle;

FIG. 2 is an enlarged detail of the adjacent portions of the forward and rearward vehicles, of FIG. 1, the rearward vehicle being used to push the forward vehicle;

FIG. 3 is a perspective view of the operative portions of the hitch assembly, partly exploded, with parts broken away, in order to better illustrate the function of the several parts;

FIG. 4 is a plan of the drawbar depicted in FIG. 3, illustrating the preferred configuration of the drawbar.

In the drawings like characters of reference designate similar parts in the several figures.

In its essence, the present invention comprises a push-pull hitch for coupling a pair of self-powered traction vehicles for alternate selective pulling effort of the leading vehicle upon the following vehicle and pushing effort of the following vehicle upon the leading vehicle comprising, for pushing effort: a pair of registering bumper assemblies mounted, respectively, on the rear portion of the leading vehicle and the front portion of the following vehicle, adapted for mutual registration when the two vehicles may be substantially out of alignment; and for pulling effort: a coupling comprising a hook member mounted on one vehicle and a U-shaped drawbar member mounted on the other vehicle, adapted selectively to be lowered into engagement with said hook member and disconnected therefrom, the width and design of said hook member being such that coupling is possible when the two vehicles are in motion and are substantially misaligned vertically or horizontally.

Referring to the characters of reference in the several drawings, 10 depicts generally the leading tractor or scraper, and 11 depicts generally the rearward tractor or scraper.

Such vehicles are self propelled and normally rubber tired, and the operative components thereof such as the front end steering and the bowl lift are hydraulically powered. Full articulation of the bowl portion of the vehicle in relation to the forward operator's cab portion is normally provided, each of such portions being separately ground-supported; such vehicles are well known and since the specific details thereof form no part of the invention, further description thereof is deemed unnecessary.

Referring now to the rear section of the forward vehicle 10, a portion of the chassis 12 normally extends rearwardly from the vehicle, for the purpose of accepting pushing assist. Frequently guards, such as the pair of guard horns 13 are welded to the rearwardly extending portion of the chassis 12, which serve to protect the rearwardly mounted radiator of the forward vehicle 10 when being pushed by the following vehicle.

If such horns 13 are not already installed, it has been found desirable for the purpose of this invention to install them, in order to prevent inadvertent damage to the radiator of the leading vehicle 10 from the following vehicle 11, which may occur when the vehicles are being operated over exceptionally uneven ground.

Position rearwardly of the guard horns 13, and desirably in the plane of the chassis 12, is a leading vehicle bumper unit generally designated 14 in FIG. 3. Such bumper unit comprises a bumper plate 15 mounted generally vertically on a pair of horizontal support member 16, secured as by welding to the rearwardly extending chassis 12 of the forward vehicle 10. Alternatively, a horizontally journalled roller may be substituted for the bumper plate 15, in order to facilitate relative vertical movement of the paired vehicles when in pushing engagement.

A pull hook 17 is secured as by welding to the horizontal support member 16 by means of a pull hook plate 18, secured horizontally laterally between the members 16 as by welding.

Thus, it will be seen that the forward vehicle 10 is equipped to be pushed on the bumper plate 15, and is equipped to pull by means of the pull hook 17. All of these members are rigidly mounted to the rearwardly extending chassis portion 12.

Considering now the following vehicle 11, the front portion of the chassis 19 normally substantially overhanging the front end of the vehicle as depicted in FIGS. 1 and 2, is equipped with a front bumper and a coupler assembly designated generally 20 in the drawings. A pair of vertical gusset members 21 are rigidly secured as by welding to the chassis portion 19, and form the base of the front bumper and coupler assembly 20. A bumper unit generally designated 22 is pivotally mounted between the gusset members 21, by means of a pin 23. The bumper unit 22 comprises a push plate 24, and a pair of mounting lugs 25, fixedly secured as by welding to the push plate 24, journaled for pivotal engagement with the pin 23, which extends into the gusset members 21, for journal engagement therewith, as depicted in FIG. 3.

A rubber-cushioned shock-absorbing push block 26, comprising a block of solid rubber 27 mounted between a pair of plates 28, is secured centrally to the overhanging chassis portion 19, as by bolting or welding of the rearward member of the pair of plates 28. The thickness of the rubber-cushioned push block 26 is such that when the push plate 24 is not in contact with the bumper unit of the front vehicle 10 and the rubber block 27 is uncompressed, the alignment of the front surface of the push plate 24 will be slightly off vertical, the bottom edge 29 of the push plate 24 being in advance of the top edge 30. It will be apparent that other readily available shock-absorbing means such as hydraulic or pneumatic cylinders, or spring assemblies, may be substituted for the preferred embodiment described above and such shock-absorbing means may be operatively secured to either the leading vehicle bumper unit or the following vehicle bumper unit.

The front bumper and coupler assembly 20 is positioned on the front end of the rearward vehicle 11, so that when the forward vehicle 10 and the rearward vehicle 11 are on level ground, the push plate 24 of the rearward vehicle 11 registers with the bumper plate 15 of the forward vehicle 10. Desirably, the depth of the push plate 24 is substantially greater than the depth of the bumper plate 15 of the leading vehicle, so that notwithstanding substantial irregularities in terrain, a portion of the push plate 24 on the rearward vehicle will engage and bear against the bumper plate 15 of the forward vehicle 10.

Because of the design of the bumper plate 15 and the push plate 24, being of substantial width in relation to the overall width of vehicles, the operator of the following vehicle is not required to bring the two vehicles into substantial alignment for pushing assist; it has been found that for effective engagement, the width of each of the bumper plates 15 and the push plates 24 on the leading and following units respectively should desirably be not less than 20% of the overall width of the vehicle, and for convenience, ease of operation and economy of manufacture, not more than 40% of the overall width of the vehicle.

The front bumper and coupler assembly 20 of the rearward vehicle 11, having been described thus far with reference to its pushing function, will now be further described with reference to its pulling function. The coupler assembly 20 additionally comprises a drawbar 31, shaped in a generally U-configuration, as depicted in FIG. 4. The width of the drawbar is slightly greater than the width of the push plate 24 of the rearward vehicle 11, permitting the drawbar 31 to swing upwardly and clear of the push plate 24 when the rearward vehicle 11 is being used in pushing effort, as will be hereinafter explained.

The legs 32 of the drawbar 31 are mounted for pivoting upon a pair of gusset members 33 secured, as by welding, to the overhanging chassis portion 19 of the rearward vehicle 11. Suitable pivot means, such as the pins 34, provide satisfactory mounting means for the drawbar 31 upon the gusset members 33.

The drawbar 31 is so shaped that the configuration of the cross-member 35 thereof, at least on its inner surface 36, is concave, so that when the drawbar 31 registers with the hook 17 of the forward vehicle, as will be hereinafter explained, such registration tends to position the hook 17 at the mid-point 38 of the crossmember 35 and thereby align the two coupled vehicles, thus providing a uniform distribution of load on the legs 32 of the drawbar 31.

The drawbar 31 swings from its substantially horizontal operative position to its inoperative raised position by means of one, or a pair of pneumatic cylinders 37, the moveable piston element of which is connected as by an operating rod 38 to a gusset 39 rigidly secured to one of the legs 32 of the drawbar 31, by pivot means such as the pin 40. The pneumatic cylinder 37 will be secured at its opposite end 41 to the chassis of the rearward vehicle 11 by a suitable pivot mount 41.

It has been found that a pneumatic cylinder 37 is preferable to a hydraulic cylinder, because of the compressability of the operating air as opposed to the non-compressability of hydraulic fluid, when subject to accidental impact on the drawbar 31; a hydraulic lift has been found to frequently rupture, due to the extremely high pressure built up within the hydraulic system at the time of such accidental impact, whereas the pneumatic lift absorbs the shock of such accidental impact by compressibility of the air within the system.

A position indicator designated generally 42 is operatively connected with the drawbar 31, so that the operator riding in the cab of the rearward vehicle 11 may readily determine whether the drawbar 31 is in raised or lowered position. A convenient position indicator is depicted in the drawings, consisting of a generally vertical indicator rod 43, pivotally secured to the gusset member 39, sliding in a pivotally mounted sleeve 44, secured to the radiator 45 of the rearward vehicle 11. The length of the indicator rod 43 is such that when the drawbar 31 is in lowered position, only a smaller portion of the indicator rod 31 extends beyond the sleeve 44; when the drawbar 31 is in raised position, a substantial portion, desirably several inches, of the indicator rod 43 will be seen to extend beyond the end of the sleeve 44, thereby indicating to the operator that the drawbar 31 is in raised position.

The drawbar 31 is so positioned on the pair of gussets 33 and the travel of the operating rod 38 of the pneumatic cylinder 37 is such that the drawbar 31 has an arc of travel of approximately 65°, from extremity positions of approximately 30° below horizontal to approximately 35° above horizontal. This relatively large arc of travel of the drawbar 31 co-operating with the position of the hook element 17 of the forward vehicle 10, which is mounted at the rearmost extremity of the bumper unit 14, permits substantial relative vertical movement of the leading and following vehicles 10 and 11, without accidental disengagement of the drawbar 31 from the concave forward face of the hook 17; additionally, the aspects of the two vehicles relative to the horizontal may differ substantially, without accidental disengagement of the drawbar 31 and the hook 17, as when uneven terrain is encountered or when the rear of the leading vehicle or the front of the following vehicle raises upon ground-engagement of the associated scoop element.

When the hitch is used between a pair of scraper units as depicted in FIG. 1, normally the leading vehicle 10 will first be filled, the bowl on the rearward vehicle 11 being raised from ground contact into its inoperative position. Therefore, the leading unit 10 will be assisted in its tractive effort by the rearward unit 11 pushing against the rear bumper unit 14 of the leading vehicle 10 with the bumper assembly 22 of the rearward unit 11, at which time the drawbar 31 will be raised into its inoperative position from its operative position indicated in the broken outline at 46 in FIG. 2. During this operation, the rubber-cushioned push block 26 will absorb the shock of impact between the two vehicles 10 and 11, developed when the vehicles come into engagement, or the relative speeds of the vehicles change for any reason.

When the bowl of the forward vehicle 10 is filled, the bowl is then raised into its carrying position, and the bowl of the rearward unit 11 is then lowered into its operative in engagement with the ground to be removed. In order to assist the tractive effort of the rearward vehicle 11, the function of the forward vehicle 10 then becomes one of pulling the rearward vehicle 11, and to accomplish this the drawbar 31 is lowered by the operator to engage the hook 17, and the two vehicles 10 and 11 then again operate in coupled fashion.

Because of the design of the drawbar 31 being of substantial width in relation to the overall width of the vehicle, the operator of the following vehicle has no difficulty in "hunting" for the hook 17, through misalignment of the two vehicles. It has been found that for effective coupling. the width of the drawbar 31 should desirably be not less than 20% of the overall width of the vehicle, and for convenience, ease of operation and economy of manufacture, not more than 40% of the overall width of the vehicle. As soon as the hook 17 has been engaged by any portion of the interior 36 of the drawbar 31, the two vehicles 10 and 11 will then tend to come into alignment, because of the concavity 38 on the interior surface 36 of the drawbar 31, which establishes a "centering" effort on the hook 17.

It is important and significant that each of the operations hereinabove described, i.e. the supplemental pushing effort and the supplemental pulling effort, are carried out while both vehicles are being operated at normal loading ground speeds, which becomes possible by the design of the device of the present invention, wherein pushing or pulling coupling is possible notwithstanding substantial misalignment of the two vehicles.

When the bowl of the following vehicle has been loaded, with the tractive assist of the leading vehicle, and thus both vehicles are loaded, it is normally desirable to disconnect the two vehicles in order that each may then proceed independently to the site of discharge. To accomplish this, the operator of the following vehicle will momentarily increase the relative speed of the following vehicle, thereby disengaging the drawbar 31 from the concave forward face of the hook member 17, thereby permitting the drawbar 31 to be raised into its extreme lifted position, at which point the pair of vehicles are uncoupled and mutually independent.

The couplings of the present invention are inexpensive to produce, durable in operation, convenient to employ, readily installed in the field on most existing scraper units without other modifications, and by a relatively small investment permits the operators of a train of tractor-scrapers to pool the power of individual units thereof to overcome excessive loading or other power requirements achieving a more efficient and rapid completion of earth moving operations.

Since various modifications can be made to the invention herein described with the scope of the inventive concept disclosed, it is not intended that protection of the said invention should be interpreted as restricted to the modification or modifications or known parts of such concept as have been particularly described, defined, or exemplified, since this disclosure is intended to explain the construction and operations of such concept, and not for the purpose of limiting protection to any specific embodiment or details thereof.

What I claim as my invention is:

1. A push-pull hitch for coupling a pair of self-powered traction vehicle units for alternate selective pulling effort of the leading vehicle upon the following vehicle and pushing effort of the following vehicle upon the leading vehicle comprising, in combination:

a leading vehicle bumper assembly mounted in overhanging relationship on the rearward portion of the leading vehicle, and a following vehicle bumper assembly mounted in overhanging relationship on the front portion of the following vehicle and adapted to register with the said leading vehicle bumper assembly when said leading vehicle and the said following vehicle are in pushing engagement, including a flat generally rectangular bumper plate mounted substantially vertically upon the rearward portion of said leading vehicle and in which said following vehicle bumper assembly includes a flat generally rectangular push plate mounted substantially vertically upon the forward portion of said following vehicle and adapted to register with said bumper plate, the depth of said rectangular push plate being substantially greater than the depth of said push plate; and releasable coupling means mounted on the rearward portion of said leading vehicle and the front portion of said following vehicle, respectively adjacent to said bumper assemblies, adapted to releaseably couple said vehicles for pulling effort of said leading vehicle upon said following vehicle, comprising a hook assembly mounted upon a first vehicle of said pair of self-powered traction vehicles in a position disposed towards the second vehicle of said pair of vehicles, and releaseable drawbar means mounted upon a second vehicle of said pair of self-powered traction vehicles in a position disposed towards the first vehicle of said pair of vehicles, said drawbar means including a U-shaped drawbar having a cross member and a pair of outstanding leg members, and mounting means for pivotal mounting of said pair of outstanding leg members of said drawbar upon said second vehicle for selective engagement of said drawbar with said hook assembly mounted upon said first vehicle.

2. The device according to claim 1 in which the width of each of said bumper plate and said push plate is from approximately 20% to approximately 40% of the width of the vehicle upon which said bumper plate and said push plate are mounted, respectively.

3. The device according to claim 1 in which the width of each of said bumper plate and said push plate is from approximately 20% to approximately 40% of the width of the vehicle upon which said bumper plate and said push plate are mounted, respectively, and additionally comprising shock absorber means operatively connected to said following vehicle bumper assembly.

4. The device according to claim 1 in which the width of each of said bumper plate and said push plate is from approximately 20% to approximately 40% of the width of the vehicle upon which said bumper plate and said push plate or mounted, respectively, and additionally comprising shock absorber means operatively connected to said leading vehicle bumper assembly.

5. The device according to claim 1 in which said following vehicle bumper assembly comprises:

a flat rectangular push plate having a top edge and bottom edge, and pivot mounting means secured to said top edge of said push plate;

push plate support means secured to said front portion of said following vehicle and operatively engaging with said pivot mounting means; and stop means positioned upon said front portion of said following vehicle adapted to limit the rearwards pivotal movement of said push plate when said push plate is in pushing engagement with said leading vehicle bumper plate.

6. The device according to claim 1 in which said following vehicle bumper assembly comprises:

a flat rectangular push plate mounted substantially vertically upon the forward portion of said following vehicle and adapted to register with said bumper plate, said push plate having a top edge and a bottom edge, the depth of said rectangular push plate being substantially greater than the depth of said rectangular bumper plate;

pivot mounting means secured to said top edge of said push plate;

push plate support means secured to said front portions of said following vehicle and operatively engaging with said pivot mounting means; and stop means positioned upon said front portion of said following vehicle adapted to limit the rearwards pivotal movement of said push plate when said push plate when said push plate is in pushing engagement with said leading vehicle bumper plate.

7. The device according to claim 1 in which said following vehicle bumper assembly comprises:

a flat rectangular push plate mounted substantially vertically upon the forward portion of said following vehicle and adapted to register with said bumper plate, said push plate having a top edge and a bottom edge, the width of each of said push plate and said bumper plate being from approximately 20% to approximately 40% of the width of the vehicle upon which said push plate and said bumper plate are mounted, respectively;

pivot mounting means secured to said top edge of said push plate;

push plate support means secured to said front portion of said following vehicle and operatively engaging with said pivot mounting means; and stop means positioned upon said front portion of said following vehicle adapted to limit the rearwards pivotal movement of said push plate when said push plate is in pushing engagement with said leading vehicle bumper plate.

8. A push-pull type hitch for coupling a pair of self-powered traction vehicle units for alternate selective pulling effort of the leading vehicle upon the following vehicle and pushing effort of the following vehicle upon the leading vehicle comprising, in combination:

a leading vehicle bumper assembly including a generally flat rectangular bumper plate mounted substantially vertically upon the rearward portion of said leading vehicle;

a hook rigidly mounted upon said rearward portion of said leading vehicle adjacent said bumper plate;

a following vehicle bumper assembly including a generally flat rectangular push plate having a top edge and a bottom edge, and pivot mounting means secured to said top edge of said bumper plate;

push plate support means secured to said front portion of said following vehicle and operatively engaging with said pivot mounting means;

resilient stop means positioned upon said front portion of said following vehicle adapted to limit the rearwards pivotal movement of said push plate to a substantially vertical position when said push plate is in pushing engagement with said leading vehicle bumper plate;

a U-shaped drawbar having a cross member and a pair of outstanding leg members, the length of said cross member being slightly greater than the width of said push plate of said following vehicle bumper assembly and so adapting said U-shaped drawbar to enclose said following vehicle bumper assembly when mounted upon said front portion of said following vehicle;

pivot mounting means for pivotal mounting of said pair of outstanding leg members of said U-shaped drawbar to said front portion of said following vehicle including a pair of vertically mounted gusset plates rigidly secured to said front portion of said following vehicle adjacent to and on each side of said following vehicle push plate, and bearing means in said gusset plates adapted for journal mounting of said pair of outstanding leg members of said U-shaped drawbar thereon;

lift means operatively connecting said drawbar to said front portion of said following vehicle adapted to raise and lower said drawbar through an arc defined within limits of the locus of travel of said cross member of said drawbar when pivoted about said pivot mounting means; and a source of power of lifting said drawbar through said arc.

9. The device according to claim 8 in which the limits of said arc defined by said locus of travel are approximately 30° below horizontal and approximately 35° above horizontal.

10. The device according to claim 8 in which the length of said cross member of said drawbar is from approximately 20% to approximately 40% of the width of said following vehicle.

11. The device according to claim 8 in which the width of each of said push plate and said bumper plate are from approximately 20% to approximately 40% of the width of the vehicle upon which said push plate and said bumper plate are mounted, respectively.

12. The device according to claim 8 in which the length of said cross member of said drawbar is from approximately 20% to approximately 40% of the width of said following vehicle, and in which the width of each of said push plate and said bumper plate are from approximately 20% to approximately 40% of the width of the vehicle upon which said push plate and said bumper plate are mounted respectively.

13. The device according to claim 8 in which said lift means includes:

a fluid-operated cylinder and piston assembly;

an operating rod pivotally connected by one end thereof to the outer end of the piston rod of said cylinder and piston assembly and by the other end thereof to said drawbar at a point thereon remote from said pivot mounting means;

a source of fluid under pressure operatively connected to said cylinder and piston assembly; and fluid transfer and control means for selectively and controllably directing said source of fluid under pressure to said cylinder and piston assembly.

14. The device according to claim 8 in which the interior edge of said cross member of said U-shaped drawbar is concave.

References Cited

UNITED STATES PATENTS

| | | | |
|---|---|---|---|
| 1,807,379 | 5/1931 | Burrows | 280—477 |
| 2,529,159 | 11/1950 | Hyler | 280—481X |
| 2,587,208 | 2/1952 | Peterson | 280—481X |
| 2,788,999 | 4/1957 | Fryer | 280—481 |
| 3,015,162 | 1/1962 | Bohnet | 33—46 |
| 3,079,176 | 2/1963 | Duke et al. | 280—481 |
| 3,159,917 | 12/1964 | Whitehead | 280—477X |
| 3,243,203 | 3/1966 | Hermiz et al. | 280—481 |
| 3,434,738 | 3/1969 | Campbell et al. | 280—477 |

LEO FRIAGLIA, Primary Examiner

U.S. Cl. X.R.

280—481